Patented Sept. 24, 1940

2,215,883

UNITED STATES PATENT OFFICE 2,215,883

PRODUCTION OF HYDROGEN PEROXIDE

Hans-Joachim Riedl and Georg Pfleiderer, Ludwigshafen-on-the-Rhine, Germany, assignors, by mesne assignments, to Walter H. Duisberg, New York, N. Y.

No Drawing. Application April 5, 1938, Serial No. 200,122. In Germany April 7, 1937

2 Claims. (Cl. 23—207)

The present invention relates to the production of hydrogen peroxide.

It is known that hydrogen peroxide is formed by the autoxidation of certain readily oxidizable organic compounds, the hydrogen atoms of which can easily be split off, as for example by the autoxidation of hydrabenzene, anthrahydroquinone and like substances. This reaction, as it is also known, may be employed for the production of hydrogen peroxide by carrying out the autoxidation in a solvent in which hydrogen peroxide is insoluble or from which it can be washed out by means of water. The process may be carried through in a cycle, the organic oxidation product being reduced again and re-employed for the autoxidation. Such a process is especially economical if the oxidation product of the organic compound can be smoothly and simply reconverted into the initial substance and if the oxidation and reduction can be carried out in a long-lasting alternation. Such cyclic operation can be best accomplished if the autoxidation and the reduction take place in one solution, an intermediate separation of the organic substances being avoided in this way. Such procedure, however, makes it a condition that both the autoxidizable substance and the oxidation product thereof are readily soluble in the solvent employed.

We have now found that this condition can be best fulfilled by using, instead of a single solvent, a solvent mixture one constituent of which has a better dissolving power for the autoxidizable substance, while the other constituent has a better dissolving power for the autoxidation product, and from which mixture the hydrogen peroxide can be separated or washed out. The solvent mixture may also be made up from more than two liquids. Naturally the solvents used should be practically indifferent against the substances used in the process, at least they must not be altered in such a manner as to render them unsuitable for the performance of the process.

The constituents of the solvent mixture are preferably so selected that the dissolving power of each liter of the constituent corresponds at least to two tenths of the molecular weight of the respective substance to be dissolved, a dissolving power corresponding to one tenth or less of the molecular weight being however also sufficient in some cases. Suitable solvent mixtures are for example mixtures of benzene and cyclohexanol, toluene and amyl alcohol, xylene or anisol and iso-heptyl alcohol, anisol and methylcyclohexanol. The ratio between the components of the solvent mixture is so chosen that the dissolving power of the mixture for the substance of inferior solubility ensures economy of the process, a result which is in some cases already obtained when the output of hydrogen peroxide per each liter of the solution amounts to about 1 gram in one throughput.

The following example serves to illustrate how the present invention may be carried out in practice but the invention is not restricted to this example.

Example

A solution of 15 grams of 2-ethyl-anthraquinone in a mixture of 40 c. c. of anisol and 60 c. c. of iso-heptyl alcohol is shaken at room temperature with hydrogen in the presence of an active nickel catalyst. In this way the solution is laden with about up to 800 c. c. of hydrogen, without a separation of 2-ethylanthrahydroquinone taking place. Then the catalyst is separated and the oxidation with oxygen is carried out. Thus the process yields in one single throughput about 1 gram of hydrogen peroxide. The peroxide is washed out by means of water and the operation repeated.

When using, however, a solution of 15 grams of 2-ethylanthraquinone in 100 c. c. of anisol, a separation of 2-ethylanthrahydroquinone, when working at room temperature, sets in already after the absorption of about 100 to 150 c. c. of hydrogen. Therefore, to ensure a wasteless filtration from the catalyst, the solution must be laden only with about 100 c. c. of hydrogen. By shaking with oxygen the solution absorbs an amount of oxygen which corresponds to that of the hydroquinone dissolved. The output amounts only to about 0.12 gram of hydrogen peroxide.

In iso-heptyl alcohol alone 2-ethyl-anthraquinone is but badly soluble, and a satisfactory working is not possible.

What we claim is:

1. In a process of producing hydrogen peroxide by autoxidation of dissolved organic compounds containing hydrogen atoms which can easily be split off in a cyclic operation involving the separation from the reaction medium of the hydrogen peroxide formed, reduction of the oxidized organic compound to re-form the autoxidizable initial material and re-introduction of the latter into the process, the step which comprises dissolving the organic compound in a mixture of solvents, at least one constituent of which has a better dissolving power for the autoxidizable compound and at least one other constituent of which has a better dissolving power for the autoxidized product.

2. In the process of claim 1, the use of a solvent mixture the constituents of which are so selected that the dissolving power of each liter of a constituent corresponds at least to two-tenths of the molecular weight of the respective substance to be dissolved.

HANS-JOACHIM RIEDL.
GEORG PFLEIDERER.